United States Patent [19]
Baron et al.

[11] Patent Number: 5,977,958
[45] Date of Patent: Nov. 2, 1999

[54] METHOD AND SYSTEM FOR DIGITIZING HANDWRITING

[75] Inventors: Ehud Baron, Haifa; Victor Korsensky, Nesher; Omry Genossar, Haifa, all of Israel

[73] Assignee: Inmotion Technologies Ltd., Haifa, Israel

[21] Appl. No.: 08/885,188

[22] Filed: Jun. 30, 1997

[51] Int. Cl.⁶ .................................................. G08C 21/00
[52] U.S. Cl. ...................... 345/179; 178/19.01; 345/156; 367/117; 382/187; 382/188
[58] Field of Search ................ 178/19.01, 19.02, 178/19.05, 19.07; 382/187, 188, 189; 345/156, 179; 367/117

[56] References Cited

U.S. PATENT DOCUMENTS

| | | |
|---|---|---|
| 4,206,314 | 6/1980 | Prugh et al. . |
| 4,318,096 | 3/1982 | Thornburg et al. . |
| 4,506,354 | 3/1985 | Hansen . |
| 4,564,928 | 1/1986 | Glenn et al. . |
| 4,588,757 | 5/1986 | Mori et al. . |
| 4,641,354 | 2/1987 | Fukunaga et al. . |
| 4,654,648 | 3/1987 | Herrington et al. . |
| 4,758,691 | 7/1988 | De Bruyne . |
| 4,777,329 | 10/1988 | Mallicoat ................................. 178/18 |
| 4,814,552 | 3/1989 | Stefik et al. . |
| 4,862,152 | 8/1989 | Milner . |
| 4,980,519 | 12/1990 | Mathews ................................. 178/19 |
| 4,991,148 | 2/1991 | Gilchrist . |
| 5,142,506 | 8/1992 | Edwards . |
| 5,227,522 | 7/1993 | Suzuki . |
| 5,247,137 | 9/1993 | Epperson . |
| 5,294,792 | 3/1994 | Lewis et al. ............................. 250/221 |
| 5,308,936 | 5/1994 | Biggs et al. . |
| 5,349,139 | 9/1994 | Verrier et al. ............................. 178/19 |
| 5,414,227 | 5/1995 | Schubert et al. ......................... 178/18 |
| 5,475,401 | 12/1995 | Verrier et al. ........................... 345/179 |
| 5,510,800 | 4/1996 | McEwan . |
| 5,517,579 | 5/1996 | Baron et al. . |
| 5,589,838 | 12/1996 | McEwan . |
| 5,717,168 | 2/1998 | DeBuisser et al. ....................... 178/19 |

Primary Examiner—Bipin H. Shalwala
Assistant Examiner—Vincent E. Kovalick
Attorney, Agent, or Firm—Mark M. Friedman

[57] ABSTRACT

A system and method for tracking a moving object very accurately at short ranges in general, and a handwriting input device such as a pen in particular. The method is based on measuring times of arrival of ultrashort RF pulses transmitted by the pen to an array of receivers. Dealing with the ultrashort events is done by "strobing" the pen position. To achieve the necessary resolution, on the order of 0.25 mm, the times of arrival of the pulses are determined by sampling the pulses digitally and fitting appropriate mathematical functions to the samples pulses. The time jitter is averages over many sweeps, and a dedicated receiver is used for synchronization.

26 Claims, 7 Drawing Sheets

METHOD AND SYSTEM FOR DIGITIZING HANDWRITING

FIELD AND BACKGROUND OF THE INVENTION

The present invention relates to digital input devices and, more particularly, to a method and system for digitizing handwriting while the user is writing.

Systems exist that are capable of digitizing the motion of a writing implement in real time. These systems fall into two broad categories: those that rely on a digitizing tablet, and those that do not. Examples of systems that rely on digitizing tablets include those described in U.S. Pat. No. 4,206,314 to Paden, U.S. Pat. No. 4,318,096 to Thornburg, U.S. Pat. No. 4,564,928 to Glenn, U.S. Pat. No. 4,641,354 to Fukunaga and U.S. Pat. No. 4,558,757 to Mori. These systems generally are suited to the real time digitization of handwriting; but they require the provision of a digitizing tablet, which often is inconvenient.

Systems that are independent of digitizing tablets generally lack sufficient accuracy for the digitization of handwriting. The system described by Epperson in U.S. Pat. No. 5,247,137 relies on an accelerometer-based inertial navigation system to track the writing implement. Because the position of the writing implement is determined by a double integration of the measured accelerations, this system is subject to an amount of drift that is unacceptably large for the present application. Other systems measure the coordinates of the writing implement directly, using one or another type of global positioning system. Systems based on propagation times of ultrasonic pulses are described by Hansen in U.S. Pat. No. 4,506,354; by Herrington, in U.S. Pat. No. 4,654,648; by the De Bruyne, in U.S. Pat. No. 4,758,691; by Mallicoat, in U.S. Pat. No. 4,777,329; by Sterfik, in U.S. Pat. No. 4,814,552; by Milner, in U.S. Pat. No. 4,862,152; by Gilehrist, in U.S. Pat. No. 4,991,148; by Edwards, in U.S. Pat. No. 5,142,506; and by Biggs, in U.S. Pat. No. 5,308,936. There are several reasons why these systems lack suitable resolution for the accurate rendition of handwriting. One is that these systems are subject to systematic errors caused by phenomena such as multiple travel paths of the ultrasonic signals. Another is that the ultrasonic signals are most conveniently generated in a frequency range, 40–60 KHz, in which the transmitted ultrasonic pulses are too long for adequate resolution. To achieve the higher frequencies and shorter pulses needed for requires high energy circuitry that cannot be packaged easily and safely in a writing implement. Suzuki describes an infrared-based system in U.S. Pat. No. 5,227,622, that suffers from the inconvenience of requiring a clear line of sight from the infrared transmitter on the writing implement to the external tracking device.

There is thus a widely recognized need for, and it would be highly advantageous to have, a system and method of digitizing handwriting in real time that is free of the limitations of the prior art systems.

SUMMARY OF THE INVENTION

According to the present invention there is provided a system for tracking a moving object, including (a) a transmitter, integral with the moving object, for transmitting a plurality of radio frequency pulses at a first repetition period; (b) a plurality of first receivers, at known mutual relative positions, each of the first receivers for receiving the radio frequency pulses upon receipt of a gating pulse and outputting a digital representation of a received amplitude of the received radio frequency pulses; and (c) a mechanism for generating a plurality of grating pulses, each of the grating pulses have a duration, the gating pulses being generated at a second repetition period, longer than the first repetition period, and for supplying each of the gating pulses substantially simultaneously to each of the first receivers, each of the first receivers than receiving the radio frequency pulses for the duration of the supplied gating pulse.

According to the present invention there is provided a method for tracking a moving object, including the steps of: (a) transmitting a plurality of radio frequency pulses, from the moving object, at a first repetition period; (b) providing a plurality of receivers at known mutual relative positions; (c) generating a plurality of gating pulses at a second repetition period longer than the first repetition period, each of the gating pulses having a duration; (d) receiving the radio frequency pulses, at each of the receivers, within the durations of the gating pulses; and (e) producing a digital representation of each of the radio frequency pulses received by each of the receivers during the durations of the gating pulses.

According to the present invention there is provided a handwriting digitization system including: (a) a handwriting input device including a transmitter for transmitting a plurality of radio frequency pulses at a first repetition period; and (b) a reception unit including: (i) a plurality of first receivers, each of the first receivers having an antenna at a known fixed position within the reception unit, each of the first receivers for receiving the radio frequency pulses upon receipt of a gating pulse and outputting a digital representation of a received amplitude of the received radio frequency pulses; (ii) a mechanism for generating a plurality of gating pulses, each of the gating pulses having a duration, the gating pulses being generated at a second repetition period, longer than the first repetition period, and for supplying each of the gating pulses substantially simultaneously to each of the first receivers, each of the first receivers then receiving the radio frequency pulses for the duration of the supplied gating pulse, and (iii) a mechanism for inferring propagation times from the transmitter to each of the first receivers based on at least two of the digital representation outputted by each of the first plurality of receivers.

According to the present invention there is provided a method of synchronously digitizing handwriting written by a user using a handwriting input device, including the steps of: (a) providing a reception unit including a plurality of receivers, each of the receivers having an antenna at a known fixed position within the reception unit; (b) transmitting, from the handwriting input device, a plurality of radio frequency pulses at a first repetition period; (c) generating a plurality of gating pulses at a second repetition period longer than the first repetition period, each of the gating pulses having a duration; (d) receiving the radio frequency pulses, at each of the first receivers, within the durations of the gating pulses; (e) producing a digital representation of each of the radio frequency pulses received by each of the first receivers during the durations of the gating pulses; and (f) inferring, from the digital representations, propagation times from the handwriting input device to the first receivers.

McEwan, in U.S. Pat. Nos. 5,510,800 and 5,589,838 both of which are incorporated by reference for all purposes as if fully set forth herein, borrowed a method from particle physics, for measuring very short repetitive events, to use radio location to measure distances on the order of one light-nanosecond (approximately one foot) or less using electronic components that operate in the Megahertz frequency range. The object being tracked transmits radio frequency pulses, with a carrier signal frequency on the order of Gigahertz, at a repetition rate of Megahertz. Receivers at known positions are synchronized to receive the pulses in time gates that are repeated at a slightly lower rate than the repetition frequency of the transmissions. Assuming that the object being tracked is effectively stationary while the time gates are repeated, and that the first time gate starts at the same time as the transmission of one of the pulses, then the time of flight from the object to a receiver is equal to the ordinal number of the time gate during which the receiver first receiver a pulse, multiplied by the amount by which the time difference between successive gates exceeds the time difference between successive pulses. Thus, if two receivers are used, the position of the object (in a plane) can be found by triangulation. If three receivers are used, then the position of the object (in a plane) can be inferred from the relative delays of travel times among the three receivers, so the first time gate need not be simultaneously with one of the transmitted pulses. Similar tracking of an object in three dimensions requires three noncolinear receivers if the first gate is simultaneous with a transmitted pulse, and four noncoplanar receivers if the first gate is not simultaneous with a transmitted pulse.

In McEwan's application, the tracking of a moving object over a range of about 10 feet, only the presence or absence of a received pulse in a time gate is used to infer the distance to the tracked object. It has been found that in order to achieve the accuracy, on the order of 0.02 inches (0.5 mm) in a range up to about 60 cm, that is needed for handwriting digitization, it is necessary to implement the method differently. Specifically, the amplitude waveforms of the received pulses are digitized, and a mathematical function is fitted to each waveform to more accurately measure a fiducial point on the waveform, such as the center of the waveform or the time of onset of the waveform, that is used as a measure of the time of arrival of the waveform. Preferably, a straight line is fitted to the initially rising portion of the waveform, and the time of zero amplitude of the fitted line is taken to be the time of onset of the waveform.

Thus, the scope of the present invention includes a modified system and method for tracking objects. Nevertheless, the focus of the present invention is on the application of this system and method to recording handwriting in real time. In that application, the tracked object is a handwriting input device, for example a pen, used to write on a writing medium such as paper. The user places a reception unit, containing two or more receivers rigidly mounted therein, next to the paper, and writes normally with the pen. Appropriate circuitry, as described below, is provided to send gating pulses simultaneously to the receivers at a rate slightly lower than the rate at which the pen transmits radio frequency pulses. Each receiver, upon receipt of a gating pulse, receives radio energy for the duration of one time gate. If the pen is tethered by a cable to the reception unit, then the time gates can be synchronized with the transmissions of the radio frequency pulses from the pen, in a manner similar to that described in U.S. Pat. No. 5,510,800, and only two receivers are needed. If the pen is not tethered, then three receivers are needed. Preferably, the pen is configured to transmit only while it is in contact with the paper, and an additional receiver is provided, along with appropriate circuitry as described below, to enable the gating pulses to be generated only while the pen is transmitting.

The reception unit is controlled by a microprocessor therein. The microprocessor receives, from each receiver (other than the receiver that is used only to tell whether the pen is transmitting), a digital representation of the amplitude received within each time gate. Based on these amplitudes, the microprocessor computes the times of arrival of the waveforms and infers, from these times of arrival, the location of the pen. Note that knowledge of the absolute location of the pen is not necessary for the digitization of handwriting. All that must be known is the relative location of the pen, i.e., the location of the pen up to a constant shift that is common to all pen locations. In some preferred embodiments of the present invention, the inferred locations are stored in a memory unit, to be downloaded later for further processing. In other preferred embodiments of the present invention, the reception unit is integrated with a communication device such as a cellular phone, and the pen locations are transmitted in real time to a remote device for further processing.

BRIEF DESCRIPTION OF THE DRAWINGS

The invention is herein described, by way of example only, with reference to the accompanying drawings wherein.

DESCRIPTION OF THE PREFERRED EMBODIMENTS

The present invention is of a system and method which can be used to track a moving object. Specifically, the present invention can be used to digitize handwriting in real time without the use of a digitizing tablet.

The principles and operation of a handwriting digitizer according to the present invention may be better understood with reference to the drawings and the accompanying description.

Figure 1:
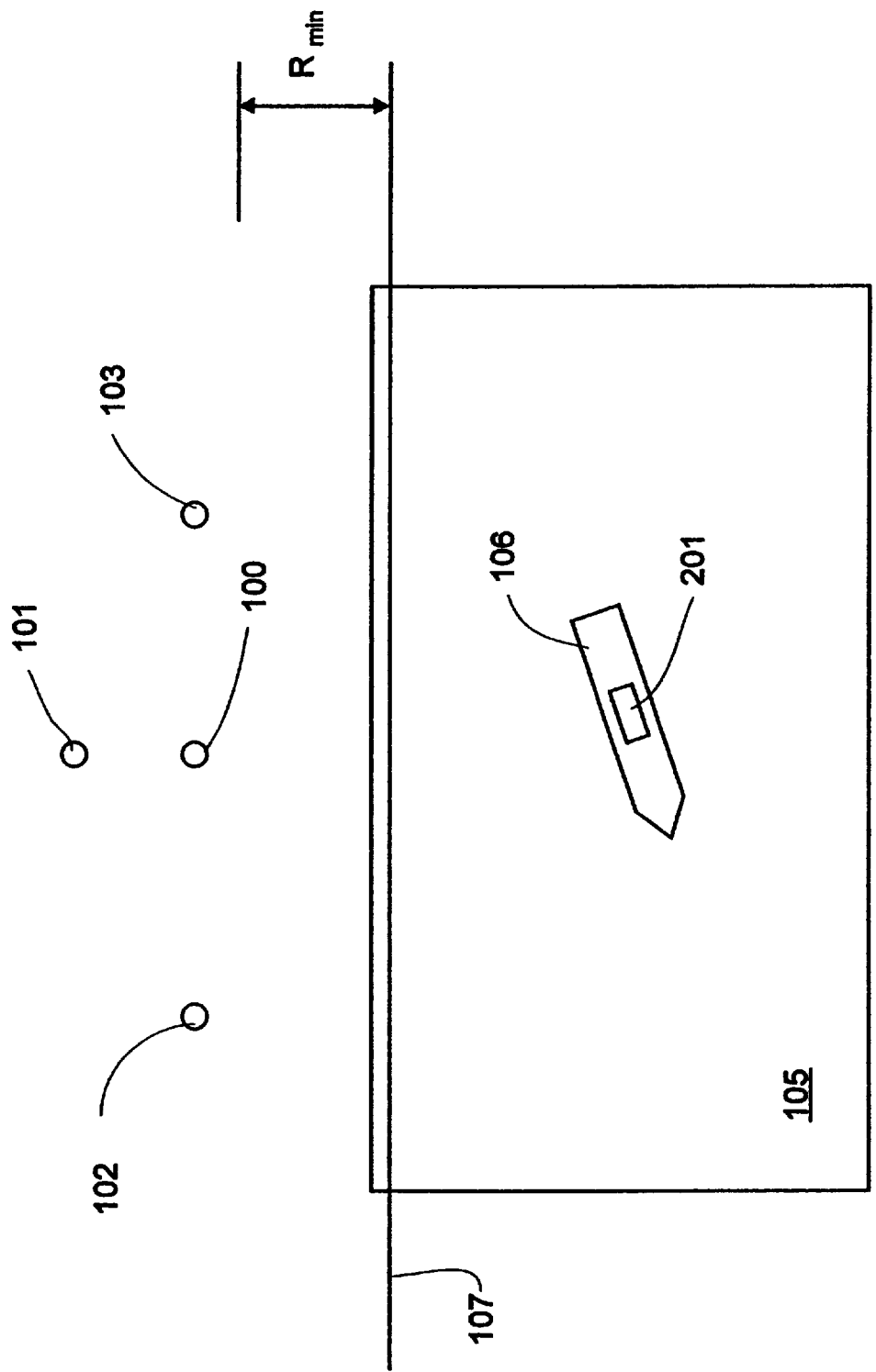
FIG. 1 is a schematic illustration of the overall geometry of a system of the present invention.
Figure 2:
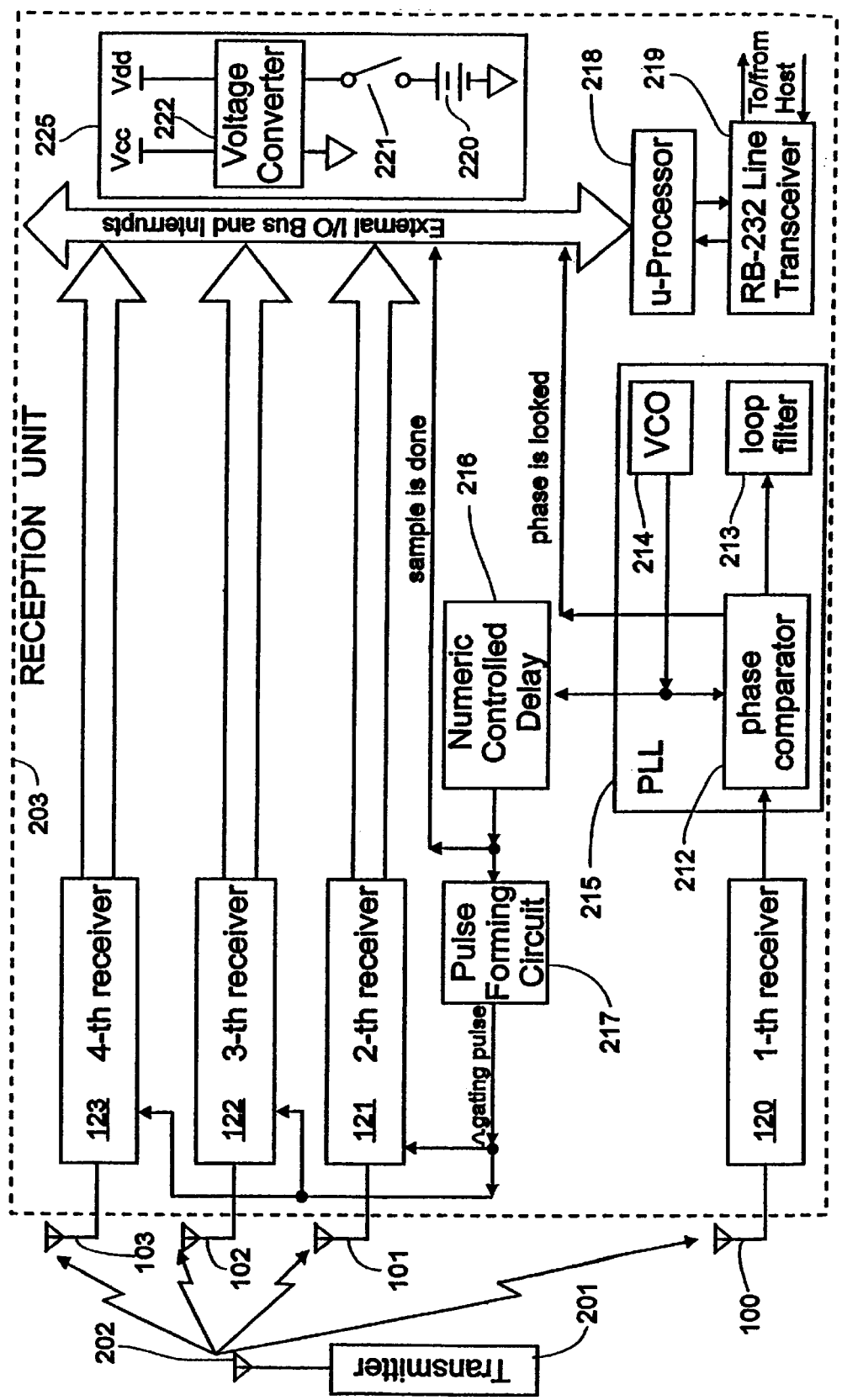
FIG. 2 is a high level block diagram of the system of FIG. 1.

Referring now to the drawings, FIG. 1 illustrates schematically the overall geometry of the system of the present invention, and FIG. 2 is a high level block diagram of the system. Antennas 101, 102 and 103 of three receivers 121, 122 and 123 are placed at the corners of an isosceles triangle. An antenna 100 of a fourth receivers 120 is placed at the base of the triangle. The triangle is placed with respect to an operating area 105, on which a handwriting input device 106 such as a pen is to be used to write, so that the distance between pen 106 and antenna 101 is always greater than the distance between pen 106 and each of antennas 100, 102 and 103. Line 107 defines the minimum operating distance $R_{min}$ of the system. The origin of the x-y coordinate system is arbitrarily chosen to coincide with the position of antenna 102.

Pen 106 includes a transmitter 201 that transmits radio frequency (RF) pulses using a carrier period $T_c$, typically on the order of 200 picoseconds or less, at a repetition period $T_s$ which is a few orders of magnitude longer the $T_c$, typically on the order of 500 nanoseconds. This operation mode has the following advantages:

(a) The average power consumption of transmitter 201 is sufficiently low that transmitter 201 is battery-powered.

(b) The average power of the RF signal is low enough to avoid interference with other such nearby systems.

(c) $T_s$ is sufficiently long relative to $T_c$ that all reverberations of the transmitted pulse decay below the background noise level before the next pulse is transmitted.

$T_s$ also is much longer than the maximum expected propagation time $T_p$ from transmitter 201 to any of antennas 100, 101, 102 or 103. Specifically, if operating area 105 is about the size of a sheet of writing paper, the maximum expected distance from transmitter 201 to any of antennas 100, 101, 102 or 103 is on the order of 60 cm, so $T_r$ is on the order of 2 nanoseconds. As noted above, each receiver 120, 121, 122 and 123 is supplied with a gating pulse of width $T_g$, on the order of $T_c/2$, at a repetition period of $T_s+T_d$, where $T_d$ is a time delay that is much shorter than $T_s$, and is typically on the order of picoseconds.

As shown in FIG. 2, receivers 120, 121, 122 and 123 are mounted in a reception unit that also includes the other components of the system, apart from transmitter 201 and transmit antenna 202 thereof. Reception unit is under the overall control of a microprocessor 218. Receivers 121, 122 and 123 are identical, and are used to measure the propagation times from transmitter 201. Receiver 200 is used to synchronize the transmissions and receptions. Receivers 121, 122 and 123 are operative to receive RF signals from transmitter 201 only when activated by gating pulses. Receiver 120 receives RF signals from transmitter 201 continuously. The amplified output from receiver 120 is applied to a phase comparator 212 that constitutes, together with a loop filter 213 and a voltage controlled oscillator (VCO) 214, a phase locked loop circuit (PLL) 215. VCO 214 is set to run freely at the pulse repetition frequency (PRF) of transmitter 201 (the reciprocal of period $T_g$). PLL 215 operates as a coherency detector: it tries to extract the underlying pattern in the noisy input signal. A properly designed PLL actually can lock onto a signal whose power is less than the ambient noise. Once the phase of the VCO signal is locked onto the PRF of the transmitted signal, PLL 215 tracks the transmitted signal and sends to microprocessor 218 the signal "phase is locked". In response to this signal, microprocessor 218 enables the output pulses of VCO 214 to trigger a numerically controlled delay circuit 216. The delay of the output pulse of circuit 216 consists of two components. The first component is a constant delay. This component is incremented by the incremental time delay $T_d$ after each pulse generation, the cumulative sums of the $T_d$'s constituting the second, variable component of the total delay. The constant delay is slightly less than $T_g$, preferably by $2T_g$ to $4T_g$, to guarantee that the next incoming RF pulse will be captured by receivers 121, 122 and 123 despite small errors in the locking of the phases of the transmitted PRF and the PRF of VCO 214. The output pulse of delay circuit 216 triggers a pulse forming circuit 217 which produces a gating pulse of a desired amplitude and of width $T_g$. This gating pulse is applied to receivers 121, 122 and 123, causing them to actively receive RF signals. The output pulse of delay circuit 216 also is sent to microprocessor 218 as a "sample is done" signal. In response to this signal, microprocessor 218 sends to delay circuit 216 a new control code that causes delay circuit 216 to generate the next output pulse with a delay that is incremented by $T_d$ relative to the previous delay. In this manner, the full range of expected $T_r$'s is scanned. Then the variable delay component is reset to zero, and the scan is repeated.

The output of receivers 121, 122 and 123 is a digital code, described in more detail below, which represents the amplitude of the sampled RF signals. These codes appear on the I/O bus of microprocessor 218, which stores them in an internal RAM for later processing.

Reception unit 203 also includes an RS-232 line driver/receiver, for communication with a host systems such as a PC or a workstation, and a power supply 225. Power supply 225 includes a battery 220, an on/off switch 221, and a step-up voltage converter 222 that converts the voltage of battery 220 into clean and stable operating voltages $V_{cc}$ for the digital circuitry and $V_{dd}$ for receivers 120, 121, 122 and 123.

Figure 3:
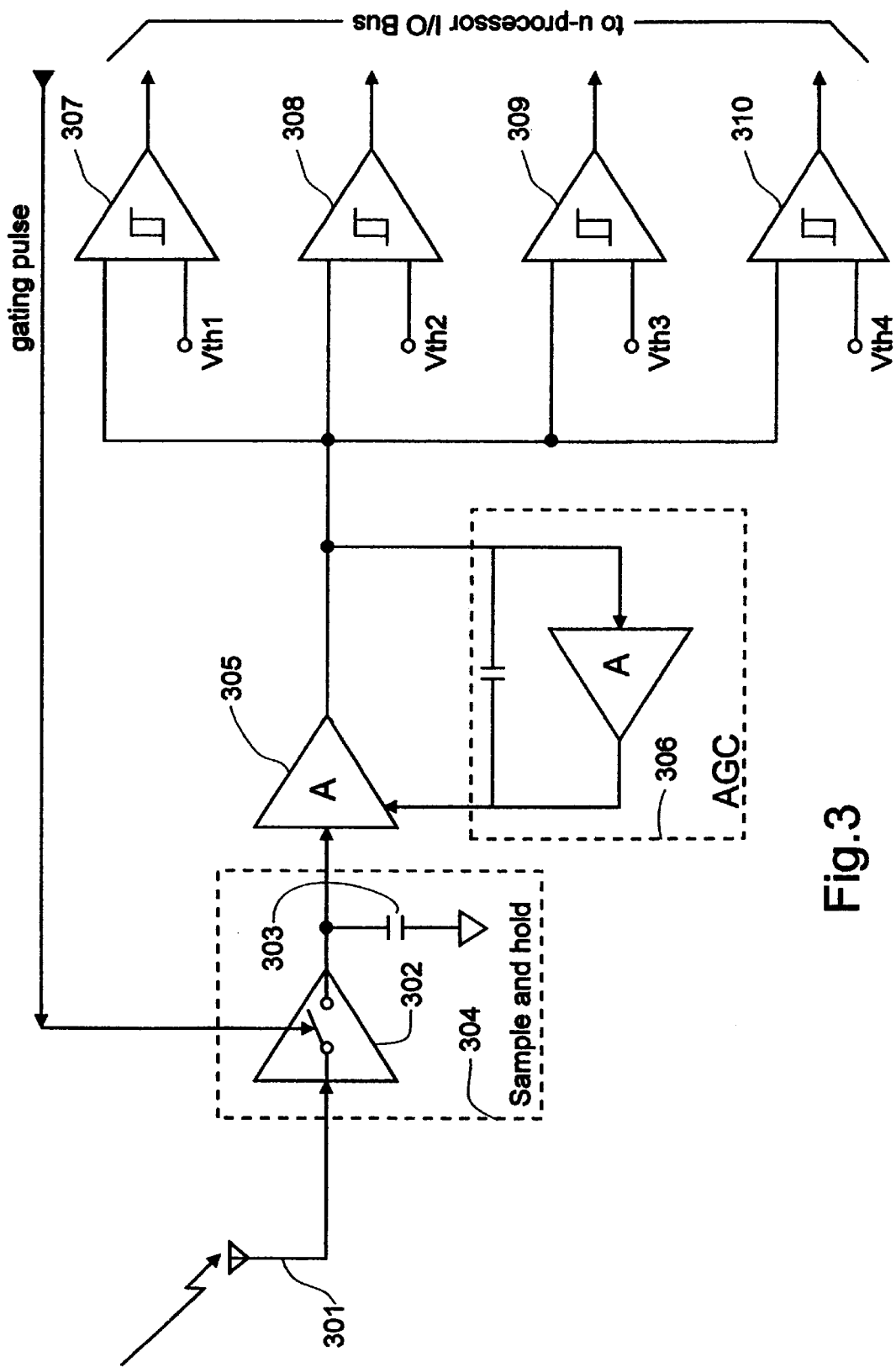
FIG. 3 is a simplified circuit diagram of a receiver of the system of FIG. 2.

FIG. 3 is a simplified circuit diagram of each of receivers 121, 122 and 123. A receiving antenna 301, representative of any of antennas 101, 102 and 103, is connected to an input gate 302. Input gate 302 forms, together with a capacitor 303, a sample-and-hold circuit 304. An incoming gating pulse from circuit 217 opens gate 302 for a short time that, in principle, is equal to $T_g$. During this time, the input of antenna 301 is connected to capacitor 303, so that operator 303 stores an instantaneous magnitude of the input RF signal. Sample-and-hold circuit 304 also performs primary signal filtering.

The voltage stored by capacitor 303 is amplified by an amplifier 305. Note that amplifier 305 is actually a sequence of conventional operational amplifiers with an added automatic gain control ((AGC) feature. These operational amplifiers must have sub-nanoampere input/bias currents. The speed requirements of the operational amplifiers are modest, because they process the signal on the equivalent time scale of $T_s$, rather than the actual propagation time scale of $T_r$. An AGC 306 maintains the amplification of the input signal to keep it normalized to an expected maximum value over the full range of operating distances of the system, despite attenuation of the RF signal with distance. The output signal of amplifier 305 is applied to the first inputs of comparators 307, 308, 309 and 310 is connected to a source of the threshold voltage Vth1, Vth2, Vth3 or Vth4, respectively. Comparators 307, 308, 309 and 310 together function analogously to a flash analog-to-digital converter (ADC). When the magnitude of the output voltage of amplifier 305 exceeds one of the threshold voltages, the corresponding comparator switches its output, and when the magnitude of the output voltage of amplifier 305 drops below that threshold value, the corresponding comparator restores the original output status. Thus, comparators 307, 308, 309 and 310 produce a four-bit unitary code that allows four levels of input signal magnitude to be distinguished. The value of the highest threshold, Vth1, is chosen to the maximum expected amplitude of the arriving RF pulse. Threshold Vth2 and Vth3 are chosen so that Vth4=Vth3=Vth3−Vth2=Vth2−Vth1.

If a higher accuracy of amplitude definition is needed, comparitors 307, 308, 309 and 310 can be replaced with an ADC.

Figure 4:
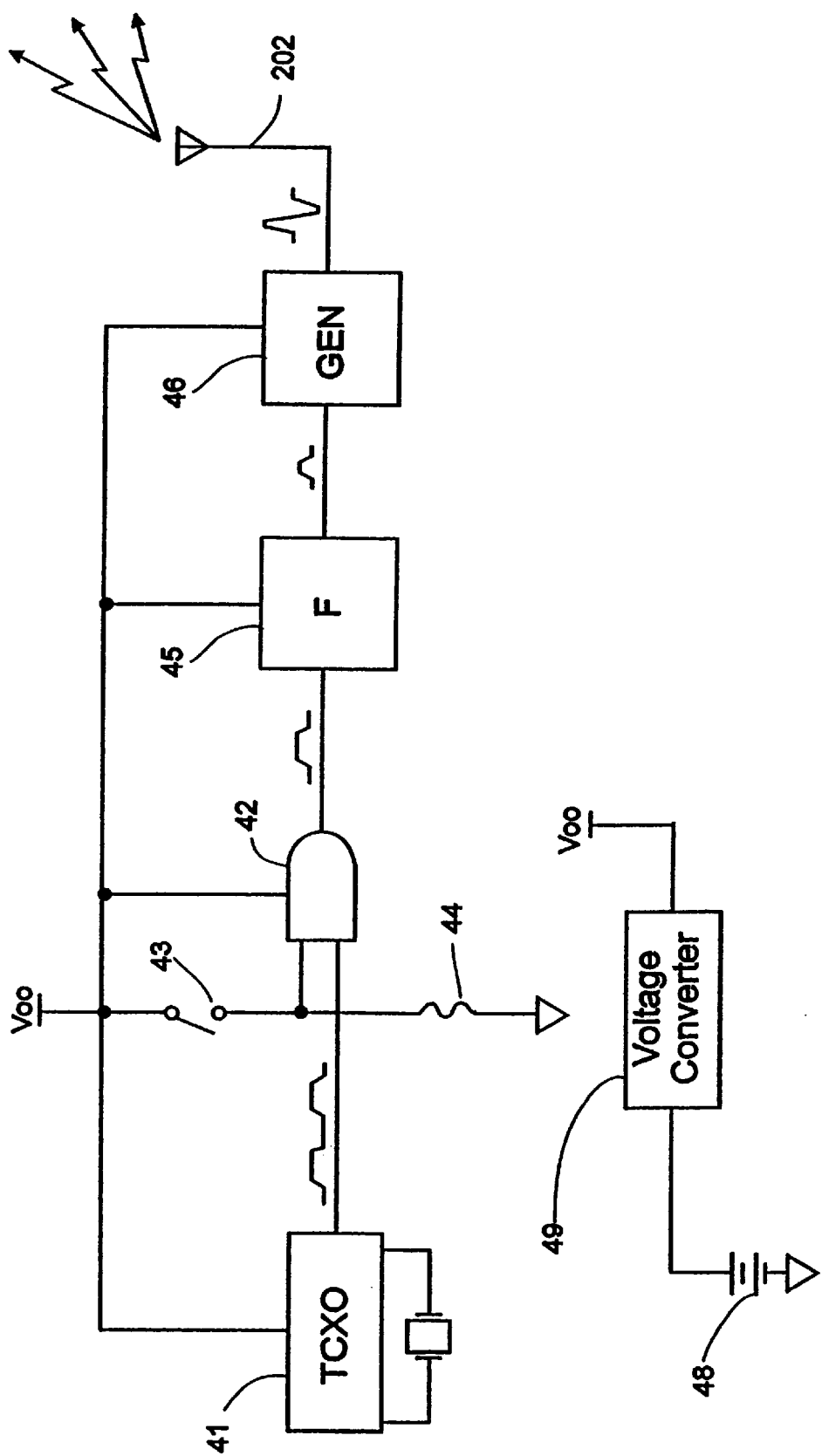
FIG. 4 is a block diagram of the transmitter of FIG. 1.

FIG. 4 is a block diagram of transmitter 201. Transmitter 201 includes a high stability temperature-compensated crystal oscillator (TCXO) 41, a membrane switch 43, and AND-gate 42, a pulse forming circuit 45, a monocycle pulse generator 46, and transmit antenna 202.

Pen 106 is able to sense when the stylus thereof contacts the writing surface. Membrane switch 43, that has a very low force of activation and an extremely small closing travel, and is designed to damp oscillations associated with surface contact, is used as a surface contact detector.

If switch 43 is closed, meaning that pen 106 is in its working position and writing is in progress, then the logical signal "1" appears on resistor 44 and enables the output clock of TCXO 41 to pass through AND-gate 42 to pulse forming circuit 45. Pulse forming circuit 45 shorts the incoming signal and the shaped output pulse excites generator 46.

Generator 46 is a high-speed transistor switch, loaded by an LC tank. Transmitter 201 sends sub-nanosecond RF pulses through antenna 202 which is omnidirectional in the horizontal plane. A battery 48, which may be an ordinary LR-44 battery, supplies voltage to a voltage converter 49 that produces a highly stable voltage to supply all circuitry of transmitter 201.

The system of FIGS. 1–4 is capable of measuring $T_r$ with an accuracy of about one picosecond, which corresponds to a distance measurement error of about ±0.3 mm. This assumes a value of $T_d$ of about one picosecond, which is achievable with delay circuit 216. The actual maximum distance measurement error from triangulation is about ±0.6 mm for an operating are 105 the size of A4 writing paper and a distance of about 150 mm between antennas 102 and 104, and changes nonlinearly over operating area 105.

System performance depends critically on the stability of the timing. The long-term stability, the initial tolerance and the temperature drift of VCO 214 and TCXO 41 are not crucial. The displacement of the center frequency of TCXO 41 could be dangerous if it causes a frequency shift out of the capture range of PLL 215. A properly designed PLL can cope with deviations of about ±10% around a central frequency. Inexpensive TCXOs that deliver a stability of 0.5 ppm to 1 ppm over the range of 0° C. to 50° C. and initial tolerances less than 10 ppm are available from many manufacturers, for example, Motorola, Ecliptec, Statec, Vector and National. These TCXOs come in the form of standard chip packages and transistor cans.

The next most important contributor to time base instability is the phase noise of PLL 215. Again, proper design can minimize but not eliminate this instability, which depends on the quality of VCO 214.

The short term stability of oscillators 41 and 215 is defined by the changes in output frequency on a short time scale (fractions of a second). These changes in frequency usually are random and are due to internal oscillator noise, output level modulation, etc. The short term stability usually is characterized by specifying either its Allan variance or its phase noise. The Allan variance of the commercially available TCXOs noted above is on the order of $3.0 \times 10^{-11}$ at times less than one second.

Various noise sources in the system modulate the time delay of the gating pulse, causing gating pulse jitter. The distribution of pulse onsets around the desired onset time can be approximated by a Gaussian distribution $$p(t) = \frac{e^{-\frac{(t-T)^2}{2s^2}}}{s\sqrt{2\pi}}$$

where p(f) is the probability of pulse onset at time t, T is the mean value of time delay, and s is the standard deviation of the distribution. The RMS jitter is defined as the standard deviation of the pulse delay distribution (s). Its estimated value is about 5 picoseconds. The peak-to-peak jitter for a single step can be 4 to 6 times larger.

The insertion delays of the pulse forming networks between the triggering time signals and their outputs are well controlled and can be equalized for different channels. Thus, the main sources of timing jitter are random and can be coped with by statistical methods.

Another significant source of error is ambient RF noise, which corrupts the amplitude and the shape of the received RF pulse, thus affecting the accuracy of the definition of the time of arrival of the RF pulse. This noise also is random and also obeys a Gaussian distribution. The random noise generated by the components in the receiving path (the Johnson noise of the resistors, the voltage and current noise of the amplifiers, etc.) also degrade system performance. The right choice of the transmitted signal power (hence the signal-to-noise ratio) and of the components can reduce these effects but not eliminate them.

Spurious signals may appear on receiver input because of multi-path propagation or interference from other RF sources. The repetition frequencies of the interfering signals usually are different from the system scanning frequency $1T_g$; and their properties, such as amplitude and duration, also are likely to be very different from the corresponding properties of the RF signal of the system of the present invention. Therefore, interfering signals can be filtered out on the hardware and processing levels. The geometry shown in FIG. 1 guarantees that any reflected signal reaches any of antennas 100, 101, 102 or 103 only after appearance of the leading edge of the directly propagated RF pulse. The time interval $T_s$ between RF pulses must be long enough so that all reflections of any pulse die down before the next pulse is transmitted. The narrow width $T_g$ of the gating window also helps to distinguish between the direct and reflected pulses.

Figure 5:
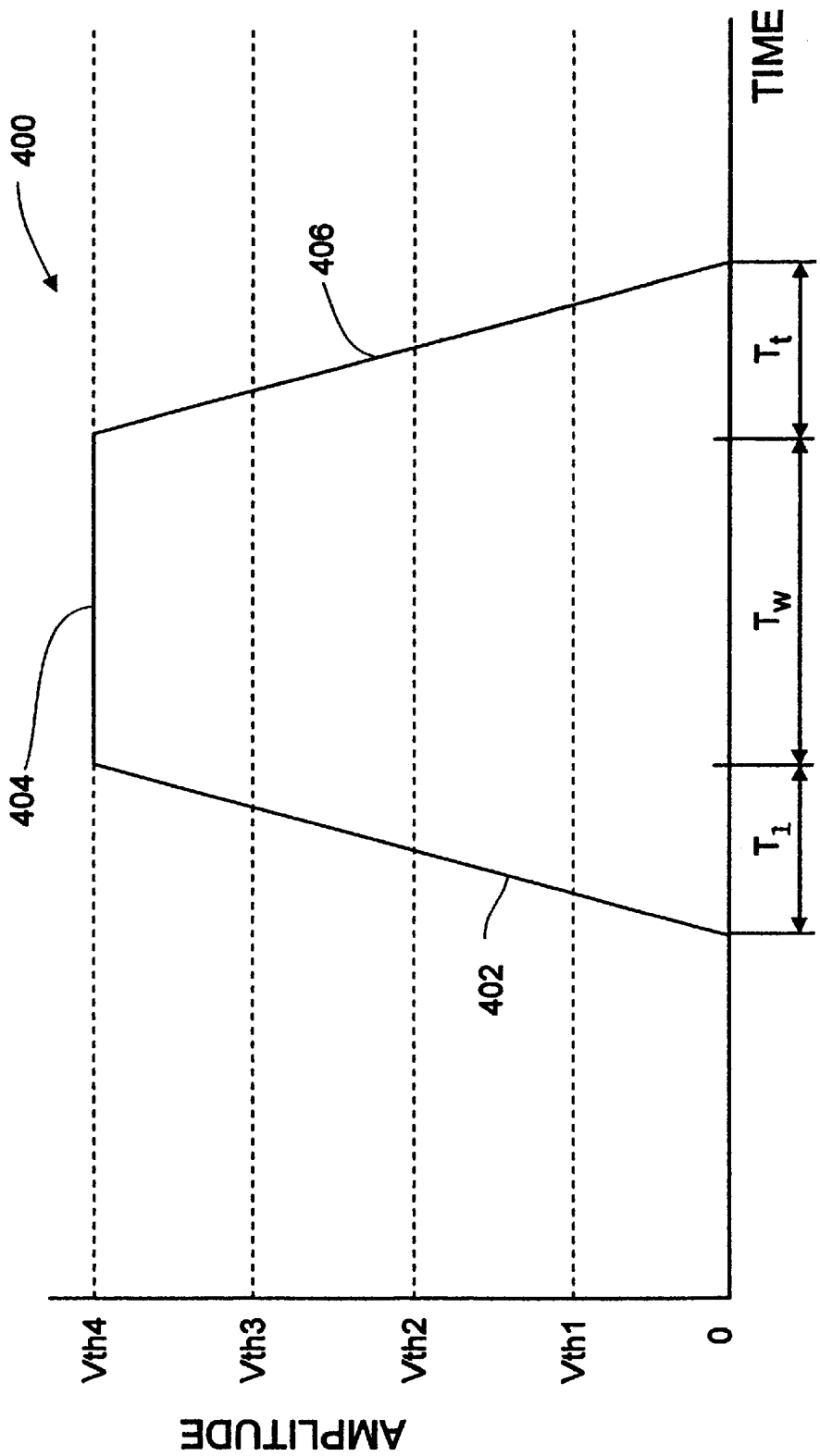
FIG. 5 is an illustration of an idealized pulse function used to fit average sample values.

To improve resolution, the digital representations of the received RF pulse that are output from receivers 121, 122 and 123 are processed by microprocessors 218, using properties of the RF pulse such as its shape, its width, and the slew rates of tis leading and trailing edges. One way in this can be done is to fit a mathematical function such as the idealized pulse function 400 shown in FIG. 5 to the digital representations of the received RF pulse. Pulse function 400 includes a linear leading edge 402, of duration $T_l$, a flat top 404, of duration $T_w$, and a linear trailing edge 406, of duration $T_t$.

Figure 6:
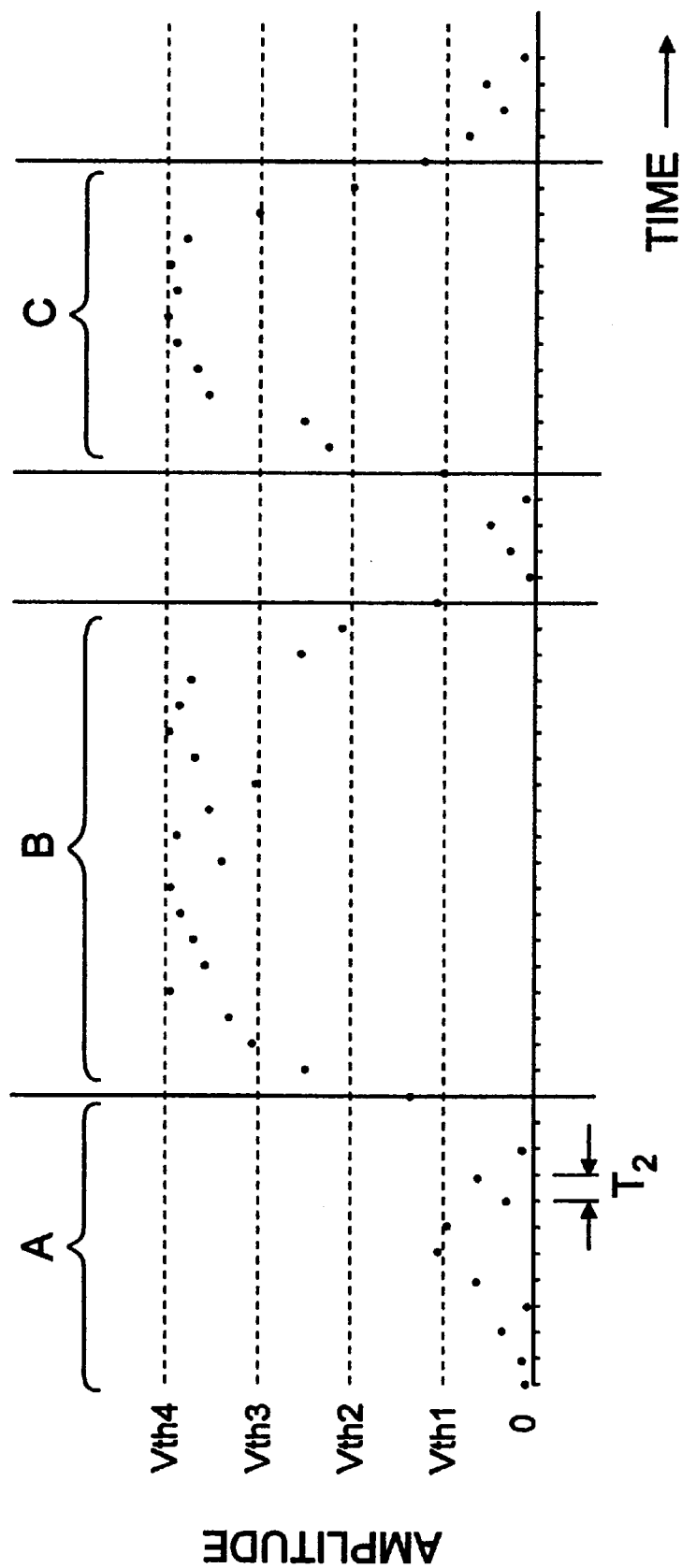
FIG. 6 is an illustration of various groups of averaged sample values.

To improve the accuracy of the fit and suppress random noise, corresponding sample values of successive scans are summed before the fit is performed. The sequential number of each cell in the internal RAM of microprocessor 218, wherein the sample values are stored, defines the position of the sample value on the equivalent time scale. When microprocessors 218 receives a new sample value it adds the new value to the previous contents of the corresponding memory cell. This procedure is repeated for several (usually 10–20) scans over the range of expected propagation times $T_r$. Because the real time recording of handwriting requires that the position of pen 106 be measured no more frequently than about 100 to 200 times per second, microprocessor 218 has enough time to alternate between data acquisition and data processing. First, the accumulated sample values are averaged. Then the processor examines the averaged data to find the pulse. This is illustrated in FIG. 6, which shows a series of averaged sample values, represented by dots, as functions of time. Note that the sampling interval shown is $T_d$, corresponding to the physical time scale of the received pulses rather than the equivalent time scale on which the measurements are made successive sample values actually are measured at increments of $T_g+T_d$. Successive averaged values, such as those in group A, that are below threshold Vth1, are ignored. If successive averaged values exhibit a trend of growth above threshold Vth1, as on the left of groups B and C, they are marked as candidates for leading edge 402 of the pulse. Subsequent averaged values are analyzed to detect pulse width $T_l+T_w+T_t$ and pulse trailing edge 406. When a sequence of averaged values equal to or greater than the minimum threshold Vth1 is found, microprocessor 218 compares the corresponding coarse pulse width with the expected pulse width $T_l+T_w+T_r$. If the coarse pulse is width is outside of a predefined range, as is the case for group B, which is wider than $T_l+T_w+T_r$: the averaged values are rejected as spurious. Otherwise, microprocessor 218 fits a straight line to the averaged values corresponding to leading edge 402, for example by linear least squares. The slope of the fitted line is compared with a range of allowed slope values. If the fitted slope is outside this range, the averaged values are rejected as spurious.

Figure 7:
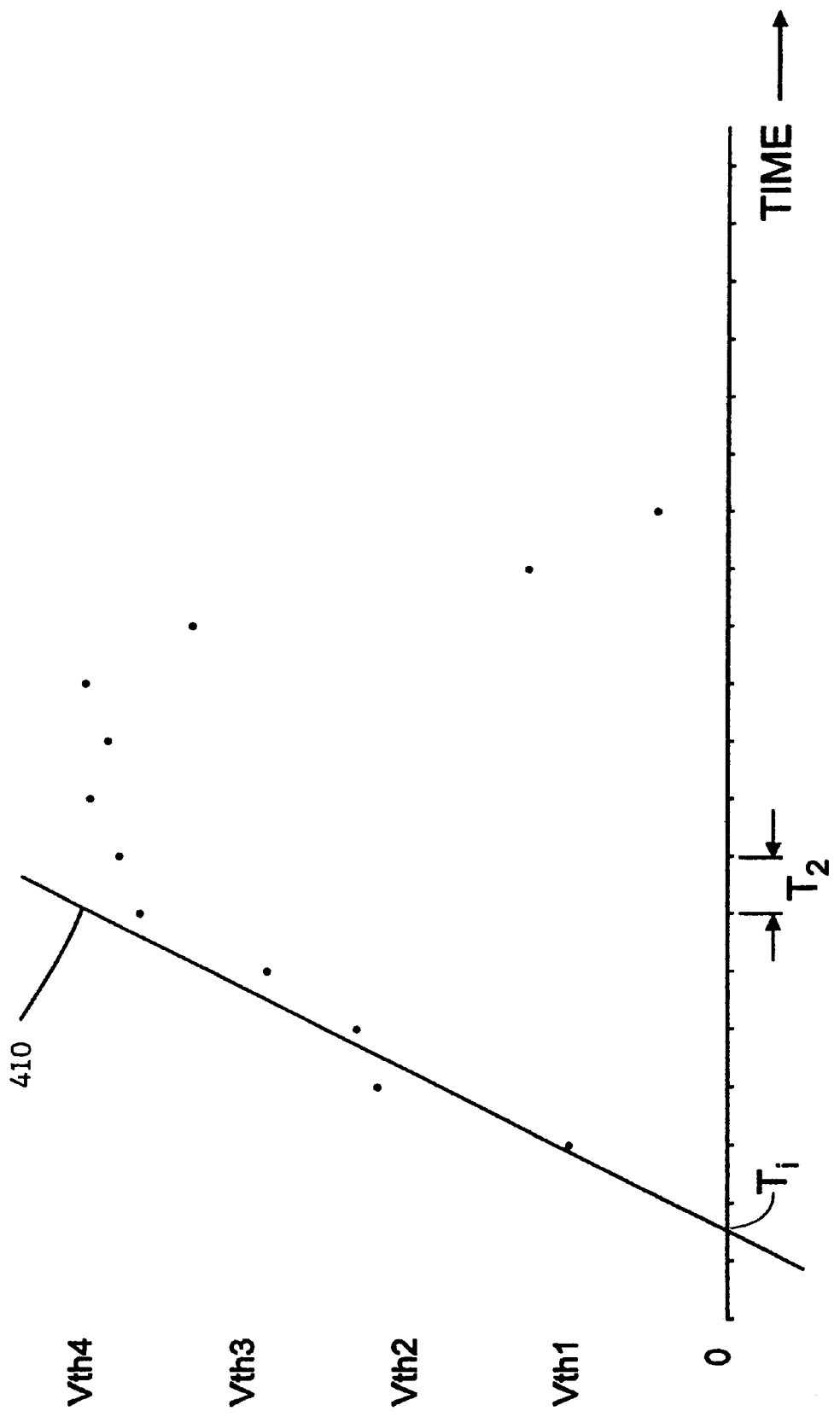
FIG. 7 shows the fitting of the leading edge of a group of averaged sample values.

The time of pulse arrival is defined by the time of a calculated fiducial point, for example, the time intercept of the line fitted to the leading edge of the pulse, or the center of the pulse width. This is illustrated in FIG. 7, which shows a group of averaged sample values, similar to group C of FIG. 6, that satisfy the width criterion, with the first several values fitted by a straight line 410 whose time intercept is $T_i$. Note that the time resolution obtained is a fraction of $T_q$. Microprocessor 218 then computes the Cartesian coordinates of pen 106 and either sends these coordinates directly to a host or saves the coordinates for later transmission.

The coordinates received by the host constitute two arrays, an array of x-values in sequence and an array of y-values in sequence. There exist commercially available character recognition software packages, for example, "Windows for Pen Computing" by Microsoft, that translates these arrays into strings of alphanumeric characters. Optionally, the output of these software packages also includes, for each character, a measure of the probability of the character having been recognized correctly, and the indices of the first and last elements of the x and y arrays that correspond to each character. Preferably, the host displays the output of the character recognition software package in a mixed format on an output device such as a CRT screen. For each character in the translated string, if the probability of correct recognition exceeds a certain threshold, the character is displayed; otherwise, the trace of sequential (x,y) points corresponding to that character is displayed, to enable the user to second-guess the character recognition software.

It is important that the pulse amplitude and slope slew rate provided to comparitors 307, 308, 309, and 310 (or equivalent ADC) be independent of the distance between pen 106 and reception unit 203. If the amplitude is too low, some valid samples will be below the threshold Vth1. This, combined with an incorrect slope, produces an error in the time intercept of the fitted pulse leading edge. As noted above, AGC 306 maintains the throughput gain such that the pulse amplitude stays constant regardless of different attenuations due to different distances of travel.

If the timings of the system of the present invention are stable, and the captured pulse shape and amplitude is constant over all of operating area 105, the coordinates of pen 106 are measured accurately as a function of time. These coordinates are sent to a host that reproduces the trajectory of moving transmitter 201 on a local display. The accuracy of the definition of the coordinates and the rate of position sampling are high enough to produce "electronic ink", i.e., the written characters can be recognized in this displayed trajectory and converted to digital text.

Microprocessor 218 must have resources an performance which are high enough to provide:

(a) storing of each sampled value in a buffered memory;

(b) real time processing of the samples (summing); and (c) completion of the data processing at the end of each measurement cycle and release of the buffer for new data acquisition.

Because the required report rate is no more than about 200 positions per second, the time between measurement cycles is about 5 milliseconds, imposing a rather modest demand on microprocessor 218.

The construction of the system of the present invention as described here is exemplary. The scope of the present invention includes equivalent manners of accomplishing the same end. For example, transmitter 201 and reception unit 203 can be synchronized using a pulsating light source, emitting sufficiently short light pulses, on pen 106. An alternative to PLL 215 is a PLL that locks the VCO frequency with a small offset to the PRF of transmitter 201. This offset results in the sliding of the gating pulse sequence relative to the input PRF. After a number of repetition periods, the transmitted pulse and the reception time gate coincide in time, and this point can be defined as the origin in time of the measurements. The drawback of this alternative is that it is slow. $T_d$ must be small enough to provide the needed resolution (a few orders of magnitude less than $T_g$), and it is necessary to wait tens of thousands of $T_g$ periods between coincidences of the transmit and receive time sequences.

While the invention has been described with respect to a limited number of embodiments, it will be appreciated that many variations, modifications and other applications of the invention may be made.

What is claimed is:

1. A system for tracking a moving object, comprising:

(a) a transmitter, integral with the moving object, for transmitting a plurality of radio frequency pulses at a first repetition period;

(b) a plurality of first receivers, at known mutual relative positions, each of said first receivers for receiving said radio frequency pulses upon receipt of a gating pulse and outputting a digital representation of a received amplitude of said received radio frequency pulses; and (c) a mechanism for generating a plurality of gating pulses, each of said gating pulses having a duration, said gating pulses being generated at a second repetition period, longer than said first repetition period, and for supplying each of said gating pulses substantially simultaneously to each of said first receivers, each of said first receivers then receiving said radio frequency pulses for said duration of said supplied gating pulse.

2. The system of claim 1, further comprising:

(d) a mechanism for inferring propagation times from said transmitter to each of said first receivers based on at least two of said digital representations outputted by each of said first plurality of receivers.

3. The system of claim 1, further comprising:

(d) a mechanism for synchronizing said transmissions of said ratio frequency pulses with said gating pulses.

4. The system of claim 1, further comprising:

(d) a second receiver, for receiving one of said radio frequency pulses and then activating said mechanism for generating said plurality of gating pulses.

5. A method for tracking a moving object, comprising the steps of:

(a) transmitting a plurality of radio frequency pulses, from said moving object, at a first repetition period;

(b) providing a plurality of receivers at known mutual relative positions;

(c) generating a plurality of gating pulses at a second repetition period longer than said first repetition period, each of said gating pulses having a duration;

(d) receiving said radio frequency pulses, at each of said receivers, within said durations of said grating pulses; and (e) producing a digital representation of each of said radio frequency pulses received by each of said receivers during said durations of said gating pulses.

6. The method of claim 5, further comprising the step of:
(f) inferring, from said digital representations, propagation times from said moving object to said receivers.

7. The method of claim 6, wherein said inferring of said propagation times includes the step of, for each receiver, fitting a mathematical function to a plurality of consecutively produced said digital representations.

8. The method of claim 7, wherein said mathematical function is linear.

9. The method of claim 7, wherein said mathematical function is parametrized, said parameters including a width.

10. The method of claim 7, wherein said consecutively produced digital representations are summed prior to said fitting of said mathematical function.

11. A handwriting digitization system comprising:
(a) a handwriting input device including a transmitter for transmitting a plurality of radio frequency pulses at a first repetition period; and
(b) a reception unit including:
  (i) a plurality of first receivers, each of said first receivers having an antenna at a known fixed position within said reception unit, each of said first receivers for receiving said radio frequency pulses upon receipt of a gating pulse and outputting a digital representation of a received amplitude of said received radio frequency pulses,
  (ii) a mechanism for generating a plurality of gating pulses, each of said gating pulses having a duration, said gating pulses being generated at a second repetition period, longer than said first repetition period, and for supplying each of said gating pulses substantially simultaneously to each of said first receivers, each of said first receivers then receiving said radio frequency pulses for said duration of said supplied gating pulse, and
  (iii) a mechanism for inferring propagation times from said transmitter to each of said first receivers based on at least two of said digital representations outputted by each of said first plurality of receivers.

12. The system of claim 11, further comprising:
(c) a mechanism for downloading records derived from said propagation times for further processing.

13. The system of claim 11, wherein said reception unit further includes:
(iv) a mechanism for synchronizing said transmissions of said radio frequency pulses with said gating pulses.

14. The system of claim 11, wherein said reception unit further includes:
(iv) a second receiver, for receiving one of said radio frequency pulses and then activating said mechanism for generating said plurality of gating pulses.

15. A method of synchronously digitizing handwriting written by a user using a handwriting input device, comprising the steps of:
(a) providing a reception unit including a plurality of receivers, each of said receivers having an antenna at a known fixed position within said reception unit;
(b) transmitting, from the handwriting input device, a plurality of radio frequency pulses at a first repetition period;
(c) generating a plurality of gating pulses at a second repetition period longer than said first repetition period, each of said gating pulses having a duration;
(d) receiving said radio frequency pulses, at each of said first receivers, within said durations of said gating pulses;
(e) producing a digital representation of each of said radio frequency pulses received by each of said first receivers during said durations of said gating pulses; and
(f) inferring, from said digital representations, propagation times from the handwriting input device to said first receivers.

16. The method of claim 15, further comprising the step of:
(g) inferring, from said propagation times, corresponding positions of the handwriting input device.

17. The method of claim 16, further comprising the step of:
(h) translating sequences of said positions to alphanumeric characters.

18. The method of claim 17, further comprising the step of:
(i) if a sequence of said positions is recognized as an alphanumeric character:
  displaying said character;
otherwise:
  displaying a trace of said sequence of said positions.

19. The method of claim 15, wherein said inferring of said propagation times include the step of, for each receiver, fitting a mathematical function to a plurality of consecutively produced said digital representations.

20. The method of claim 19, wherein said mathematical function is linear.

21. The method of claim 19, wherein said mathematical function is parametrized, said parameters including a width.

22. The method of claim 19, wherein said consecutively produced digital representations are summed prior to said fitting of said mathematical function.

23. A method for tracking a moving object, comprising the steps of:
(a) transmitting a plurality of radio frequency pulses, from said moving object, at a first repetition period;
(b) providing a plurality of receivers at known mutual relative positions;
(c) generating a plurality of gating pulses at a second repetition period longer than said first repetition period, each of said gating pulses having a duration;
(d) receiving said radio frequency pulses, at each of said receivers, within said durations of said gating pulses;
(e) producing a digital representation of each of said radio frequency pulses received by each of said receivers during said duration of said gating pulses; and
(f) inferring, from said digital representations, propagation times from said moving object to said receivers;
wherein said inferring of said propagation times includes the step of, for each receiver, fitting a parametrized mathematical function to a plurality of consecutively produced said digital representations, said parameters including a width.

24. A method for tracking a moving object, comprising the steps of:
(a) transmitting a plurality of radio frequency pulses, from said moving object, at a first repetition period;
(b) providing a plurality of receivers at known mutual relative positions;
(c) generating a plurality of gating pulses at a second repetition period longer than said first repetition period, each of said gating pulses having a duration;

(d) receiving said radio frequency pulses, at each of said receivers, within said durations of said gating pulses;

(e) producing a digital representation of each of said radio frequency pulses received by each of said receivers during said duration of said gating pulses; and (f) inferring, from said digital representations, propagation times from said moving object to said receivers;

wherein said inferring of said propagation times includes the steps of, for each receiver;

(i) summing a plurality of consecutively produced said digital representation, and (ii) fitting a mathematical function to said sum.

25. A method of synchronously digitizing handwriting written by a user using a handwriting input device, comprising the steps of:

(a) providing a reception unit including a plurality of receivers, each of said receivers having an antenna at a known fixed position within said reception unit;

(b) transmitting, from the handwriting input device, a plurality of radio frequency pulses at a first repetition period;

(c) generating a plurality of gating pulses at a second repetition period longer than said first repetition period, each of said gating pulses having a duration;

(d) receiving said radio frequency pulses, at each of said first receivers, within said durations of said gating pulses;

(e) providing a digital representation of each of said radio frequency pulses received by each of said first receivers during said durations of said gating pulses; and (f) inferring, from said digital representations, propagation times from the handwriting input device to said first receivers;

wherein said inferring of said propagation times includes the step of, for each receiver, fitting a parametrized mathematical function to a plurality of consecutively produced said digital representations, said parameters including a width.

26. A method of synchronously digitizing handwriting written by a user using a handwriting input device, comprising the steps of:

(a) providing a reception unit including a plurality of receivers, each of said receivers having an antenna at a known fixed position within said reception unit;

(b) transmitting, from the handwriting input device, a plurality of ratio frequency pulses at a first repetition period;

(c) generating a plurality of gating pulses at a second repetition period longer than said first repetition period, each of said gating pulses having a duration;

(d) receiving said radio frequency pulses, at each of said first receivers, within said durations of said gating pulses;

(e) producing a digital representation of each of said radio frequency pulses received by each of said first receivers during said durations of said gating pulses; and (f) inferring, from said digital representations, propagation times from the handwriting input device to said first receivers;

wherein said inferring of said propagation times includes the steps of, for each receiver:

(i) summing a plurality of consecutively produced said digital representations, and (ii) fitting a mathematical function to said sum.

* * * * *